A. A. SCHNEIER.
SUPPORT.
APPLICATION FILED MAY 26, 1919.
1,329,552.
Patented Feb. 3, 1920.
2 SHEETS—SHEET 1.
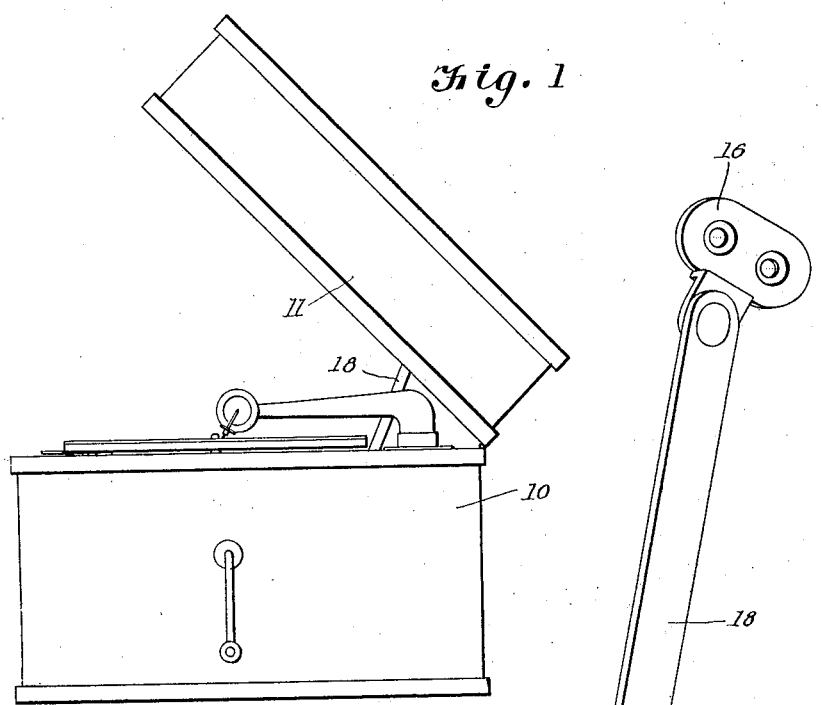
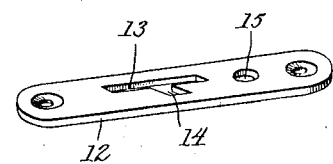
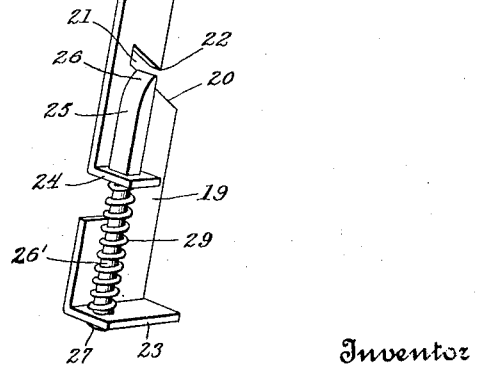
Witnesses
Geo. E. Logan
Inventor
A. A. Schneier
By Victor J. Evans
Attorney

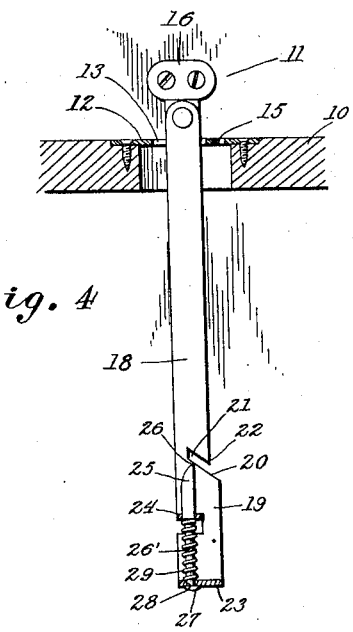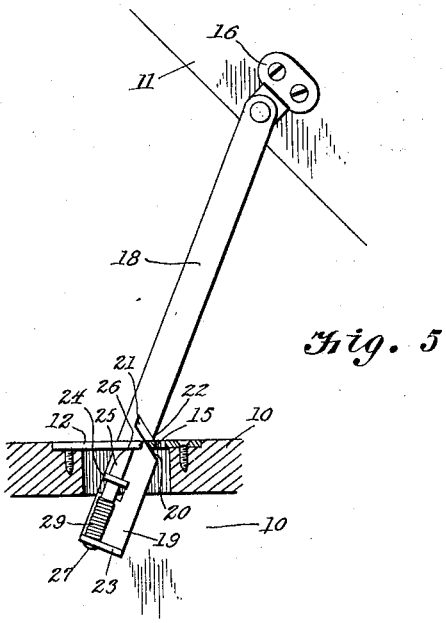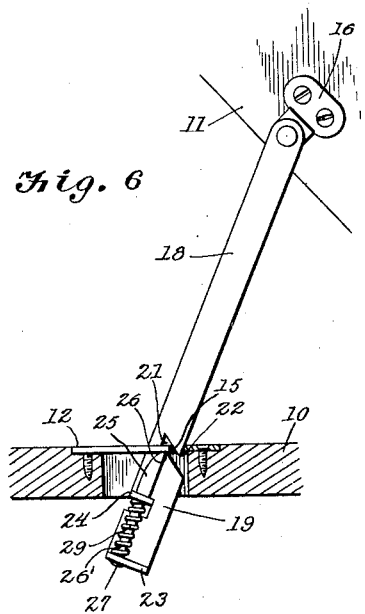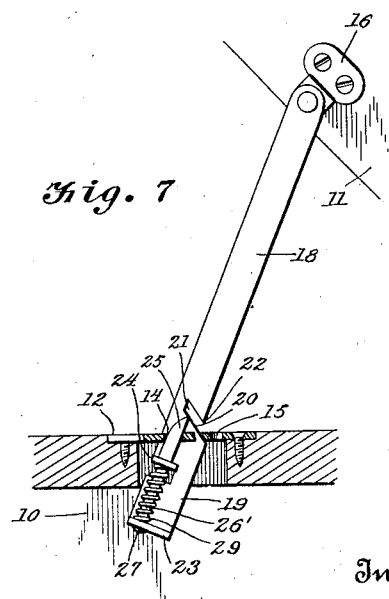

UNITED STATES PATENT OFFICE.

ADOLPH A. SCHNEIER, OF COLLEGE POINT, NEW YORK.

SUPPORT.

1,329,552.        Specification of Letters Patent.        Patented Feb. 3, 1920.

Application filed May 26, 1919. Serial No. 299,720.

*To all whom it may concern:*

Be it known that I, ADOLPH A. SCHNEIER, a citizen of the United States, residing at College Point, in the county of Flushing and State of New York, have invented new and useful Improvements in Supports, of which the following is a specification.

My present invention has reference to a means for supporting a swinging member angularly with respect to a stationary member to which the said swinging member is hinged, and the object of the invention is to produce a device of this character which will be automatic in action.

The improvement is primarily devised as a support for a phonograph, and comprises a simple construction and operative arrangement of parts designed to be brought automatically into co-engagement with each other in such a manner as to lock the cover when swung to an open position on the phonograph to effectively support the same in such position, and the parts being also so arranged as to permit of the disengagement thereof without necessitating manual operation when the cover is to be closed on the phonograph.

Other objects and advantages will present themselves as the nature of the invention is better understood, reference being had to the accompanying drawings, in which:

Figure 1 is a view showing the cover of a phonograph supported in accordance with this invention.

Fig. 2 is a perspective view of the lever and the elements connected therewith.

Fig. 3 is a perspective view of the latch plate.

Fig. 4 is a detail view, partly in elevation and partly in section showing the arrangement of parts when the cover is closed.

Fig. 5 is a similar view showing the arrangement of parts when the lever is passed through the slot in the guide element to bring the directing element on the said lever in contacting engagement with the under face of the latch plate.

Fig. 6 is a similar view showing the arrangement of parts when the lever has been moved by engagement of the guide element thereon to bring the hook on the said lever into the notch in the latch plate.

Fig. 7 is a similar view showing the arrangement of parts when the lever has been moved to engage with the latch plate to bring the spring dog carried by the lever in alinement with the transverse notch that communicates with the slot in the latch plate, to permit of the cover being brought to closed position.

My improvement is primarily devised as a support for the hinge cover of a phonograph casing, but it is to be understood that the same may be employed with equal efficiency as a support for other swinging elements.

A portion of the casing of a phonograph is illustrated in the drawings and is designated by the numeral 10. The casing 10 is provided with the usual flanged cover 11 which is hingedly secured to the back of the said casing.

On the upper face of the phonograph 10 is a latch plate 12, the same having a longitudinal slot 13 and a transverse notch 14 that communicates centrally with the slot. The top of the phonograph 10 is, of course, provided with an opening which is covered by the plate 12. The plate 12, upon its outer face, and outward of the slot 13 is formed with a depression or socket 15.

On the cover 11 is secured a bracket 16. To this bracket is pivotally secured, as at 17 a lever 18 that passes through the slot 13 in the latch plate 12. The lever 18 is in the nature of a plate or strap member and has the portion thereof disposed inward or below the latch plate widened beyond one of the edges thereof as indicated by the numeral 19. This widened portion 19 has its upper or outer edge cut at an angle, the said cut entering the lever, and the angle wall thus provided forms what I will term the guide element of the lever and the same is designated in the drawings by the numeral 20. The cut or notch 21 provided at the juncture of the lever with its widened portion 19 is arranged angularly so that the lower edge of the lever proper is provided with a substantially V-shaped portion which I will refer to as a hook and which is designated by the numeral 22. The lever, at the lower end thereof is provided with an offset or flange 23, and inward of the said flange is slitted both transversely and longitudinally to one of the edges thereof and the metal bounded by the slit is bent outwardly to provide a ledge 24. The ledge is formed with an opening of a square or rectangular formation through which passes the square or rectangular body portion of a dog 25. The dog, from one of the sides thereof is rounded to the upper or outer edge, thus providing a pointed active face 26 for the dog. The dog is provided with a cross sectionally round reduced stem 26 that passes through an opening in the flange 25, the outer end of the said stem being headed as at 27 to prevent the same passing through the opening 28 in the said flange 23. On the reduced portion or stem 26 of the dog is a helical spring 29 which exerts a pressure between the flange 23 and the lower straight end of the dog 25. By reference to the drawings it will be noted that the active edge or face 26 of the lever is normally disposed approximately in a line with the inner end of the angle guide element 20.

When the cover is swung to open position the lever proper will freely move through the slot 13 in the latch plate. When the latch plate has its under face contacted by the guide element 20 the lever will be swung angularly over the guide plate so that the hook 22 thereof will be disposed opposite the socket 15 in the guide plate, and a release of pressure in an outward direction upon the cover will permit of the beak of the hook being received in the said socket. The spring pressed dog contacting with the under face of the guide plate will hold the hook in the socket, so that the cover is effectively supported in its open angular position with respect to the casing. When it is desired to lower the cover, the same is given a slight upward swinging movement sufficient to bring the beak of the hook out of the socket. This again causes the guide element 20 to engage with the under face of the latch plate, causing the lever to be swung longitudinally of the latch plate in what I will term an outward direction, and consequently bringing the active end of the dog next to the notch 14 in the latch plate. The dog being forced outwardly by its spring will cause a slight quick noise between the said dog and latch plate to notify the operator that the lever is in a position to permit of the lowering of the cover, and the outer straight portion of the lever 18 will freely pass through the slot 13 to permit of the cover being brought to closed position on the casing.

Having thus described the invention, what is claimed as new, is:—

1. A stationary member and a hinged cover therefor, a slotted latch plate on the former, a pivoted lever on the latter passing through the slot in the plate, said lever having a downwardly extending hook and an angularly disposed guide element below and extending beyond the hook, said element, when the cover is swung to open position, designed to contact with the latch plate to swing the lever to bring the hook thereof out of the slot and over the plate, and spring means between the lever and plate for retaining the hook in contacting engagement with the plate.

2. A stationary member and a hinged cover therefor, a slotted latch plate on the former provided with a notch entering the slot, a pivoted lever on the latter passing through the slot in the latch plate, said lever having a downwardly extending hook and an angularly disposed guide element below and extending beyond the hook, a spring influenced dog on the lever disposed opposite and in a line with the inner end of the guide plate, said guide element, when the cover is swung to an open position designed to contact with the latch to swing the latter to bring the hook thereof out of the slot and over the plate, said dog designed to contact with the plate for retaining the hook in contacting engagement with said plate, and said dog being further designed, when an upward pressure is exerted on the hinge member and the lever is further guided by contact of the guide element with the latch plate, to be received in the notch of the latch plate and retain the lever in a position to enter the slot of the plate to permit of the closing of the hinge member.

In testimony whereof I affix my signature.

ADOLPH A. SCHNEIER.